US00RE36205E

United States Patent [19]

Ueda

[11] E Patent Number: Re. 36,205

[45] Reissued Date of Patent: May 4, 1999

[54] SPEEDOMETER FOR A BICYCLE

[75] Inventor: Takashi Ueda, Izumi, Japan

[73] Assignee: Cateye Co., Ltd., Osaka, Japan

[21] Appl. No.: 29/076,663

[22] Filed: Sep. 12, 1997

Related U.S. Patent Documents

Reissue of:

[64] Patent No.: Des. 374,186
Issued: Oct. 1, 1996
Appl. No.: 29/042,954
Filed: Aug. 21, 1995

[30] Foreign Application Priority Data

Jul. 12, 1995 [JP] Japan ..... 7-20252

[51] Int. Cl.[6] ..... 10 04

[52] U.S. Cl. ..... D10/98

[58] Field of Search ..... D10/98; 235/95 R, 235/95 A, 95 C; 324/160–180

[56] References Cited

U.S. PATENT DOCUMENTS

D. 361,044 8/1995 Ueda ..... D10/98

*Primary Examiner*—Antoine Duval Davis

*Attorney, Agent, or Firm*—Olson & Hierl, Ltd.

[57] CLAIM

The ornamental design for a speedometer for a bicycle, as shown and described.

DESCRIPTION

FIG. 1 is a front view of a speedometer for a bicycle showing my new design;
FIG. 2 is a rear view thereof;
FIG. 3 is a top plan view thereof;
FIG. 4 is a bottom plan view thereof;
FIG. 5 is a left side view thereof;
FIG. 6 is a right side view thereof;
FIG. 7 is a front perspective view thereof;
FIG. 8 is a referential perspective view thereof showing the state in use.
The broken line showing of a band is for illustrative purposes only and forms no part of the claimed design.

1 Claim, 3 Drawing Sheets

Figure 1:
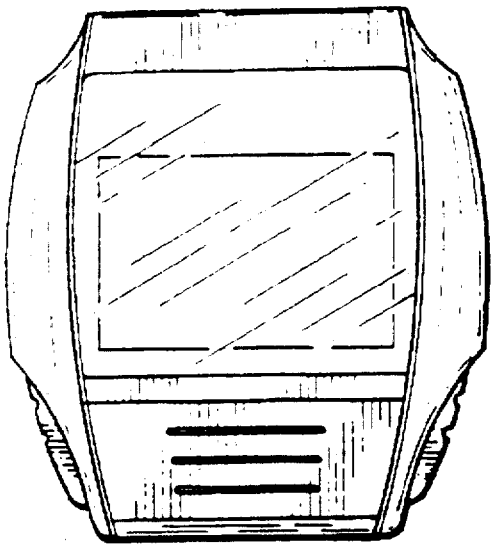
Figure 2:
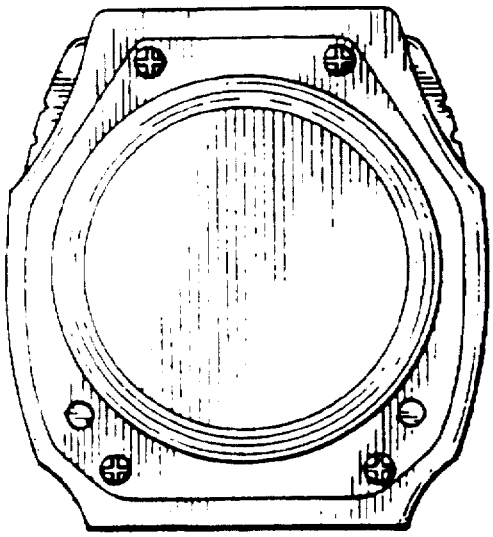
Figure 3:
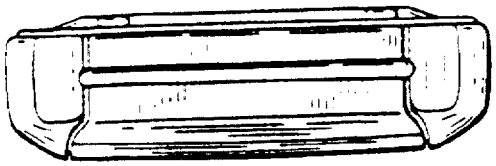
Figure 4:
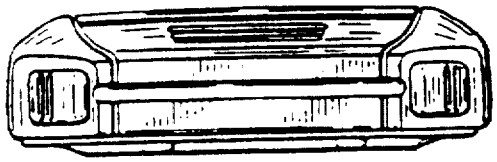
Figure 5:
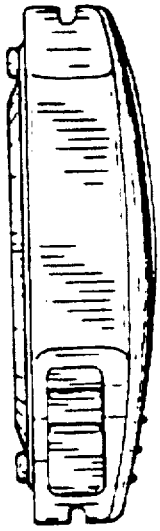
Figure 6:
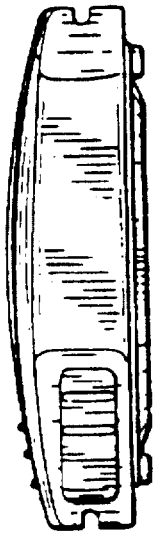
Figure 7:
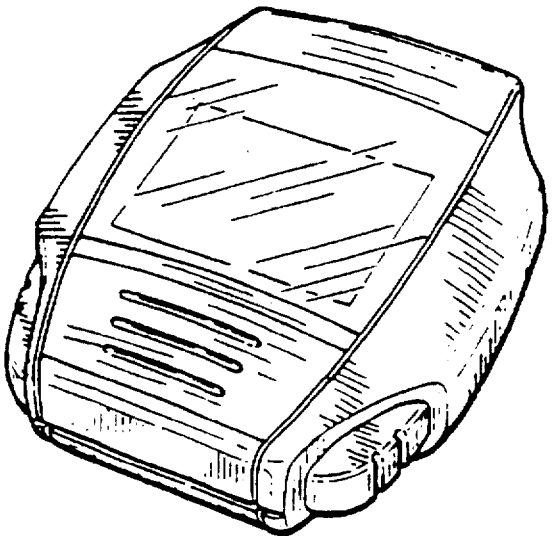
Figure 8:
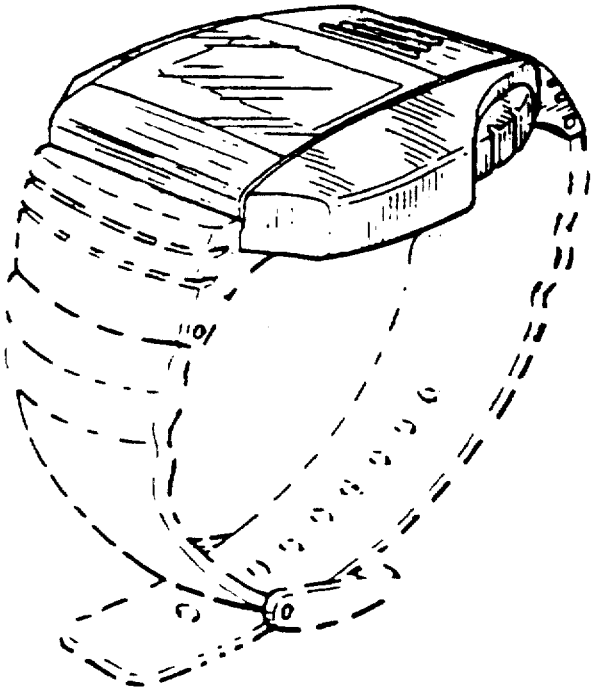

Matter enclosed in heavy brackets[ ] appears in the original patent, but forms no part of this reissue; matter printed in italics indicates the additions made by reissue.